(12) United States Patent
Walsh

(10) Patent No.: US 9,701,524 B2
(45) Date of Patent: Jul. 11, 2017

(54) SYSTEM AND METHOD FOR MOVING SHELVING

(71) Applicant: Gondola Train, Potosi, WI (US)

(72) Inventor: Richard G. Walsh, Galena, IL (US)

(73) Assignee: Gondola Train, Potosi, WI (US)

( * ) Notice: Subject to any disclaimer, the term of this patent is extended or adjusted under 35 U.S.C. 154(b) by 0 days.

(21) Appl. No.: 14/472,805

(22) Filed: Aug. 29, 2014

(65) Prior Publication Data

US 2014/0369795 A1 Dec. 18, 2014

Related U.S. Application Data

(63) Continuation of application No. 12/123,373, filed on May 19, 2008, now Pat. No. 8,845,263.

(60) Provisional application No. 60/930,779, filed on May 18, 2007.

(51) Int. Cl.
*B66F 5/00* (2006.01)
*B62B 5/00* (2006.01)
*B66F 9/06* (2006.01)

(52) U.S. Cl.
CPC .............. *B66F 5/00* (2013.01); *B62B 5/0083* (2013.01); *B66F 9/061* (2013.01)

(58) Field of Classification Search
CPC ..... B62B 5/0089; B62B 3/06; B62B 2203/10; B66F 7/22; B66F 9/00; B66F 9/061; B66F 9/065; B66F 9/082; B66F 9/12; B66F 9/127; B66F 9/18; B66F 9/16; B66F 5/00; B66F 5/02; B66F 3/005; B66F 2700/123; B66F 2700/025; B66F 2700/12; B65G 7/02; B65G 7/08; B66C 1/22; B66C 1/24

See application file for complete search history.

(56) References Cited

U.S. PATENT DOCUMENTS

| | | | |
|---|---|---|---|
| 80,600 A | 8/1868 | Clark | |
| 1,501,280 A | 7/1924 | Hinshaw | |
| 1,527,419 A | 2/1925 | Leonard, Jr. | |
| 2,296,610 A | 9/1942 | Grassick | |
| 2,521,819 A | 9/1950 | Baer | |
| 2,536,550 A * | 1/1951 | Hughes | 254/133 R |
| 2,568,827 A * | 9/1951 | Schallock | 254/133 R |
| 2,743,833 A | 5/1956 | Peterson | |

(Continued)

FOREIGN PATENT DOCUMENTS

FR 457741 9/1913

*Primary Examiner* — Glenn Myers
(74) *Attorney, Agent, or Firm* — Nixon Peabody LLP

(57) ABSTRACT

A system for moving a shelving system includes a lifting system that is operable to engage a section of a shelving system with a lifting element and to move the section of the shelving system upwardly or downwardly relative to a ground surface. The system also employs a moving device that is positionable between the shelving-system section and the ground surface when the lifting device moves the shelving-system section upwardly. The moving device also receives the section of shelving system onto a receiving area when the lifting device lowers the shelving-system section. The at least one movement component allows the at least one moving element to move relative to the ground surface. A lifting system for lifting a shelving system may include a jack and a lifting bracket that couples operation of the jack to upward or downward movement of the shelving-system section.

15 Claims, 9 Drawing Sheets

(56) References Cited

U.S. PATENT DOCUMENTS

| | | | |
|---|---|---|---|
| 2,980,271 A * | 4/1961 | Ulinski | 414/707 |
| 3,145,863 A | 8/1964 | Dunaski | |
| 3,208,768 A | 9/1965 | Hulbert | |
| 3,370,725 A | 2/1968 | Jones | |
| 3,633,774 A | 1/1972 | Lee | |
| 3,786,947 A | 1/1974 | Craft, III | |
| 3,809,261 A | 5/1974 | Lee | |
| 3,861,662 A | 1/1975 | Morse | |
| 3,923,354 A | 12/1975 | Young | |
| 4,084,125 A | 4/1978 | King | |
| 4,127,202 A | 11/1978 | Jennings et al. | |
| 4,138,173 A | 2/1979 | Taniwaki | |
| 4,312,609 A | 1/1982 | Culley, Jr. | |
| 4,462,569 A | 7/1984 | Arzouman | |
| 4,607,823 A * | 8/1986 | Thomas | B60T 17/221 254/134 |
| 4,624,468 A | 11/1986 | Onken | |
| 4,746,141 A | 5/1988 | Willis | |
| 4,824,313 A | 4/1989 | Miller | |
| 4,887,836 A | 12/1989 | Simjian | |
| 4,921,264 A | 5/1990 | Duffy | |
| 4,934,893 A | 6/1990 | Johnson | |
| 5,018,930 A | 5/1991 | Hardin et al. | |
| 5,372,353 A | 12/1994 | West | |
| 5,536,131 A | 7/1996 | Behr | |
| 5,681,139 A | 10/1997 | Szanto | |
| 5,688,102 A * | 11/1997 | Vieselmeyer | 414/724 |
| 5,782,600 A | 7/1998 | Walsh | |
| 5,822,829 A | 10/1998 | Webb et al. | |
| 6,082,956 A | 7/2000 | Pentland | |
| 6,089,545 A | 7/2000 | Norman et al. | |
| 6,146,081 A * | 11/2000 | Anderson | 414/685 |
| 6,206,628 B1 * | 3/2001 | McDermott | B62B 3/06 414/607 |
| 6,338,470 B1 | 1/2002 | Steely et al. | |
| 6,354,570 B1 | 3/2002 | Christensen et al. | |
| 6,427,979 B1 * | 8/2002 | Vogt | B66F 5/04 254/133 R |
| 6,431,805 B2 | 8/2002 | Lanciaux, Jr. | |
| D468,512 S * | 1/2003 | Hernandez | D34/23 |
| 6,561,487 B2 | 5/2003 | Siglock | |
| 6,923,466 B2 | 8/2005 | Tsai | |
| 6,971,696 B1 * | 12/2005 | Koester et al. | 294/120 |
| 7,137,615 B2 | 11/2006 | Ray, Jr. et al. | |
| 7,311,487 B1 | 12/2007 | Crossley et al. | |
| 7,328,907 B1 | 2/2008 | Bileth | |
| 7,434,783 B2 | 10/2008 | Arzouman | |
| 7,823,861 B2 * | 11/2010 | Krug | B66F 7/02 254/133 R |
| 2002/0025246 A1 * | 2/2002 | Lindgren et al. | 414/785 |
| 2002/0056692 A1 * | 5/2002 | Merkel et al. | 212/168 |
| 2004/0083025 A1 * | 4/2004 | Yamanouchi et al. | 700/213 |
| 2004/0208736 A1 * | 10/2004 | Mensch | B66F 9/144 414/685 |
| 2005/0116432 A1 | 6/2005 | Borrmann | |
| 2006/0119059 A1 | 6/2006 | O'Connor | |
| 2008/0232944 A1 * | 9/2008 | Kim | 414/667 |

\* cited by examiner

SYSTEM AND METHOD FOR MOVING SHELVING

CROSS REFERENCE TO RELATED APPLICATION

This application is a continuation application to U.S. patent application Ser. No. 12/123,373, filed May 19, 2008, which claims priority to U.S. Provisional Application No. 60/930,779 filed May 18, 2007, the contents of both of which are incorporated entirely herein by reference.

FIELD OF THE INVENTION

The present invention relates generally to systems and methods for moving shelving systems and, more particularly, to a system and method for raising one or more shelf units onto moving devices for easy and stable transport of the shelf units.

BACKGROUND OF THE INVENTION

Stores such as hardware stores, department stores, and grocery stores display their goods on shelving systems, which may include a plurality of shelf units. The shelf units are arranged throughout the store in a manner that is aesthetically appealing and allows for easy access to the displayed goods. Occasionally, it is desirable to rearrange the shelf units to offer customers a new shopping environment. The new shopping environment, for example, may offer new conveniences or may provide a shopping experience that encourages customers to consider other goods offered for sale by the store.

In one conventional technique for rearranging shelf units, all goods are first removed from the shelf units. Fixtures are subsequently disassembled/dismantled, carried to a different location in the store, and then reassembled. Then, the goods are reloaded onto the shelf units. The goods must be removed from the shelf units prior to moving them, because a fully loaded shelf unit is usually too heavy to lift and carry by hand. For example, a fully loaded shelf unit can weigh several hundred pounds. This particular technique of rearranging shelf units is undesirable because it is both time-consuming and labor intensive. It can take several days or weeks to rearrange all the shelf units in a store. Moreover, individuals moving the shelf units must expend significant energy to first unload the goods from the shelf units, manually lift and carry the unloaded shelf units, and then reload the goods onto the shelf units.

Other techniques offer systems that provide mechanical lifting devices that lift the shelving units onto rolling devices to facilitate movement of the shelf units. However, many conventional systems employ complex designs that make such systems expensive and difficult to operate. In particular, several people may be required to operate these systems. In addition, while the mechanical lifting devices may lift the shelving units, the rolling devices may be difficult to position properly under the shelf units. Furthermore, many of these systems engage the shelf units in a manner that may damage the shelf units or result in unstable movement of the shelf units.

SUMMARY OF THE INVENTION

Embodiments according to aspects of the present invention provide a system and method for moving shelf units that overcomes the shortcomings associated with the conventional techniques described previously. Embodiments provide an efficient and convenient system and method for raising shelf units onto moveable devices for stable transport of a shelving system. In an example application, embodiments may be employed to move a gondola shelving system, which is a known type of display shelving typically used in a retail store setting.

In one embodiment, a system for moving a shelving system includes a lifting system with a lifting element. The lifting system is operable to engage a section of a shelving system with the lifting element and to move the section of the shelving system upwardly or downwardly relative to a ground surface. The system also includes at least one moving device including a receiving area and at least one movement component. The moving device is positionable between the shelving-system section and the ground surface when the lifting system moves the shelving-system section upwardly relative to the ground surface. The moving device also receives the section of shelving system onto the receiving area when the lifting system lowers the shelving-system section. The movement component contacts the ground surface and allows the at least one moving element to move relative to the ground surface. The system may also include a connecting member, where at least two moving devices are stably connected by the at least one connecting member and the moving devices include coupling structures for coupling the moving devices with the connecting member.

In a particular embodiment, the moving device in the system above includes a substantially planar structure, and the receiving area is defined on a surface of the planar structure. The at least one movement device includes two rolling devices extending from the planar structure. The receiving area is positioned between the two rolling devices to stably receive the shelving-system section. The receiving area is also defined by two opposing bounding structures that support the shelving-system section received onto the receiving area. At least one of the bounding structures guides the shelving-system section onto the receiving area.

In yet another embodiment, the at least one moving device in the system above includes two substantially planar structures, and the receiving area is a channel between the two planar structures. The channel supports the shelving system received onto the receiving area, and the at least one movement device includes a plurality of rolling devices extending from the planar structures. The at least one moving device may also include a lifting-system area that receives the lifting system, allowing the lifting system to be operated with the lifting system positioned over the at least one moving device. In particular, the lifting-system area may be another channel positioned between the two planar structures and adjacent to the receiving area.

In a further embodiment, a lifting system for lifting a shelving system includes a jack with a lifting portion where the jack is operable to move the lifting portion upwardly or downwardly relative to a ground surface. The lifting system also includes a lifting bracket that is removably coupled to the lifting portion of the jack. The lifting bracket includes a lifting element, and the lifting bracket is configured to removably engage a section of a shelving system with the lifting element. The lifting bracket couples operation of the jack to upward or downward movement of the shelving-system section relative to the ground surface. The lifting bracket may also include a support member where the support member and the lifting element combine to engage the shelving system. The lifting element applies an upward force on the shelving-system section during upward movement of the lifting portion, and the support member supports the shelving system during upward movement of the shelving system. The lifting system may include a receiving structure coupling the lifting bracket to the lifting portion of the jack. The receiving structure may include a receptacle, and the lifting bracket may include a projection that is removably received by the receptacle when the receiving structure couples the lifting bracket to the lifting portion. The receiving structure may include a positioning guide guiding the projection into the receptacle when the projection is removably received by the receptacle. Furthermore, the lifting system may include a housing coupled to the jack, the housing determining upward movement of the lifting portion.

In yet another embodiment, a method for lifting a shelving system includes positioning a lifting bracket to removably engage a section of a shelving system. The method also includes coupling the lifting bracket to a lifting portion of a jack as the lifting bracket engages the shelving-system section. Additionally, the method includes operating the jack and moving the lifting portion and the lifting bracket upwardly relative to a ground surface, where movement of the lifting bracket causes corresponding upward movement of the shelving-system section. Moreover, the method also includes positioning a moving device below the shelving-system section while the shelving-system section is lifted, and operating the jack and lowering the shelving-system section onto the moving device. In one example, the shelving-system section is positioned on one side of a leg of the shelving system, and positioning a lifting bracket includes positioning a lifting element and a support member of the lifting bracket on opposing sides of the leg, where the support member provides vertical support for a face of the shelving system and the lifting element extends below the shelving-system section.

These and other aspects of the present invention will become more apparent from the following detailed description of the preferred embodiments of the present invention when viewed in conjunction with the accompanying drawings.

DETAILED DESCRIPTION

Embodiments of the present invention relate to systems and methods for raising shelf units onto a moveable device for easy and stable transport of a shelving system. In an exemplary application, embodiments may be employed to move a gondola shelving system, which is a known type of display shelving typically used in a retail store setting. However, it is contemplated that the embodiments described herein may be employed with other types of shelving systems.

In general, embodiments according to aspects of the present invention enable a shelf unit to be raised and moved by one or two persons in a few minutes. In addition, the shelf unit can often be moved without requiring any goods on the shelf unit to be unloaded. Moreover, the shelf unit can be moved without requiring any part of the shelf unit, such as bottom base shelves, to be removed or dismantled.

Unlike conventional systems, embodiments according to aspects of the present invention do not pinch or substantially compress parts of a shelving system, and as a result, the likelihood of damage to the shelving system is reduced. Once the shelf unit is positioned on the moveable device, the shelf unit is kept on center in order to keep the structure rigid and stable. The shelf unit can then be moved stably in any direction. Stable movement of the shelf unit also ensures that the shelf unit does not become damaged or inadvertently disassembled.

Figure 1:
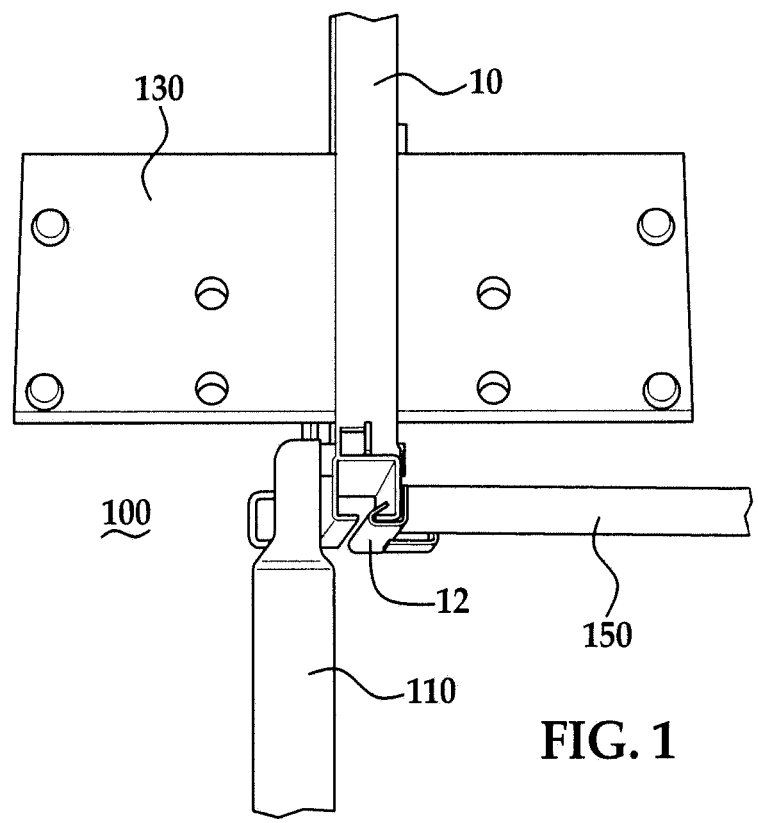
FIG. 1 illustrates an exemplary embodiment according to aspects of the present invention.
Figure 2:
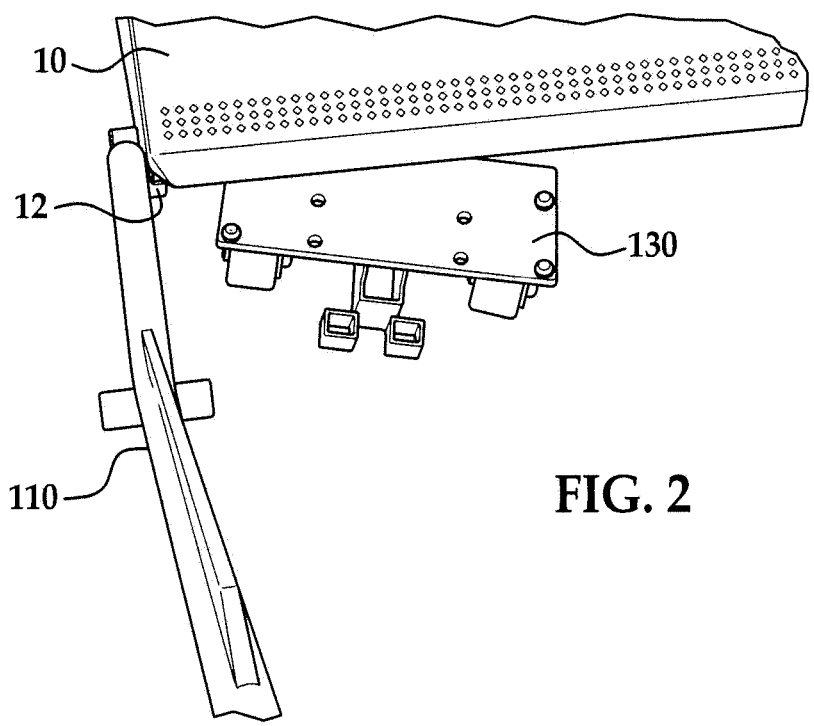
FIG. 2 illustrates the operation of the lifting device and the moving device according to the embodiment of FIG. 1.
Figure 3:
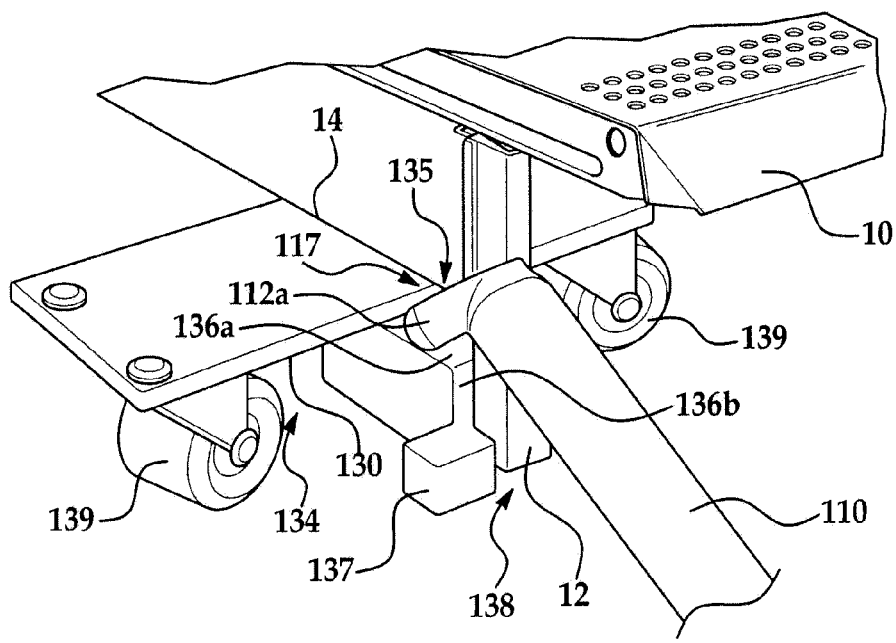
FIG. 3 illustrates further operation of the lifting device and the moving device according to the embodiment of FIG. 1.

Referring to FIG. 1, an example embodiment of a moving system 100 for raising and moving a shelving system 10, such as a gondola shelving system, is illustrated. The moving system 100 employs a lifting device 110, a moving device 130, and a connecting brace 150. The lifting device 110, as shown in FIG. 2, is designed to raise the shelving system 10 near a front leg 12. As illustrated in FIG. 3, once the shelving system 10 is raised to a sufficient height, the moving device 130 may be placed under the shelving system 10 near the front of the leg 12, and the shelving system 10 may be lowered onto a stable position on the moving device 130. Referring again to FIG. 1, the connecting brace 150 connects a plurality of moving devices 130 and supports their combined use to move the shelving system 10.

Figure 4:
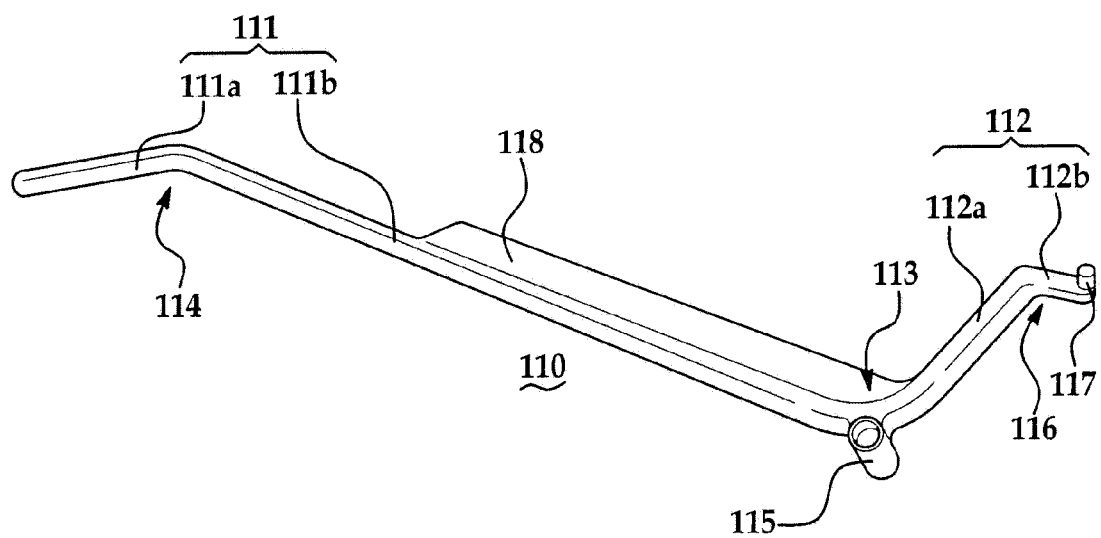
FIG. 4 illustrates the lifting device according to the embodiment of FIG. 1.

FIG. 4 illustrates the lifting device 110 in further detail. As shown, the lifting device 110 is generally elongate with multiple bends and bracing components to strengthen the lifting device 110. In an example embodiment, the total length of the lifting device 110 is approximately 6 feet, to enable a user to operate the lifting device 110 easily while standing.

The lifting device 110 includes an operating section 111 to allow a user to operate the lifting device 110. The lifting device 110 also includes an engagement section 112 that engages the shelving system 10. The lifting device 110 and the engagement section 112 may be integrally formed with each other. The operating section 111 and the engagement section 112 also define an angle 113. The operating section 111 may include an angled proximal handle portion 111a to facilitate grasping and handling of the lifting device 110. The handle portion 111a and the remainder 111b of the operating section 111 define an angle 114. In some embodiments, the handle portion 111a is generally at waist level, e.g., approximately 42 inches from the ground surface, in order to provide the user with an easy leverage position during operation of the lifting device 110.

As further shown in FIG. 4, the engagement section 112 of the lifting device 110 includes a main engagement portion 112a and an end portion 112b, which together form an angle 116 that is, for example, about 135 degrees. In particular, during operation, the end portion 112b angles downwardly from the main engagement portion 112a. The engagement section 112 is angled to enable it to go under a base section 14 of the shelving system 10 as shown in FIG. 3. In addition, referring back to FIG. 4, a lifting finger 117 extends from the end portion 112b for engaging the base section 14 during operation of the lifting device 110. As described further below, the lifting finger 117 is designed to fit between the leg 12 and the moving device 130.

FIG. 4 also shows that the lifting device 110 includes a transverse pivot element 115 located at a junction of the operating section 111 and the engagement section 112. The pivot element 115 contacts the ground surface from which the shelving system 10 is lifted. To minimize floor damage and enable easy pivoting of the lifting device 110, the pivot element 115 may be substantially cylindrical or may have a curved shape where it contacts the ground surface. Moreover, the pivot element 115 provides a wider stance that stabilizes and keeps the lifting device 110 in a stable upright position during use.

As shown in FIG. 2, when the lifting device 110 is used to lift the shelving system 10 onto the moving device 130, the lifting device 110 is sufficiently pivoted at the pivot element 115 to enable the end portion 112b to engage the shelving system 10. More specifically, as shown in FIGS. 1-3, the lifting finger 117 is installed under the shelving system 10 near the leg 12 at the base section 14. With the lifting finger 117 so installed, the user grasps the handle portion 111a and pushes downward on the operating section 111, causing the engagement section 112 to rotate upwardly about the stable pivot element 115. Correspondingly, this upward motion of the engagement section 112 causes the lifting finger 117 to apply an upward force to the base section 14 near the leg 12. Advantageously, the lifting finger 117 applies the upward force without any pinching, grasping, or significant compression of the base section 14, thereby minimizing the likelihood of damage to the base section 14.

The lifting device 110 may be composed of a rigid, durable material capable of lifting several hundred pounds without deformation. In a particular example embodiment, the operating section 111 and the engagement section 112 are formed from a single steel pipe having an outer diameter measuring approximately 1.25 inches. The angled handle portion 111a of the operating section 111 has a length of approximately 12 inches, and the remainder 111b of the operating section 111 has a length of approximately 40 inches. Thus, approximately 52 inches is provided from the pivot point 115 to the end of handle portion 111a to receive the downward force for raising the shelving system 10. Furthermore, in this particular example, the main engagement portion 112a has a length of approximately 9 inches, and the end section 112b is approximately 2.5 inches. The pivot element 115 is also formed from a steel pipe having a length of approximately four inches and an outer diameter measuring approximately 1.25 inches. The pivot element 115 may be welded to the junction of the operating section 111 and the engagement section 112. The lifting finger 117 is also formed from a steel pipe having a length of approximately 2 inches and an outer diameter measuring approximately 0.625 inches.

To reinforce the lifting device 110, the lifting device 110 may include a reinforcement plate 118 connected, e.g., welded, to both the operating section 111 and the engagement section 112. The reinforcement plate 118 helps to prevent the lifting device 110 from bending about the junction joining the operating section 111 and the engagement section 112, thereby maintaining the inclusive angle 113. In an example embodiment, the plate 118 has a maximum length of approximately 24 inches, a width of approximately 1.5 inches, and a thickness of approximately 0.25 inches.

Figure 5:
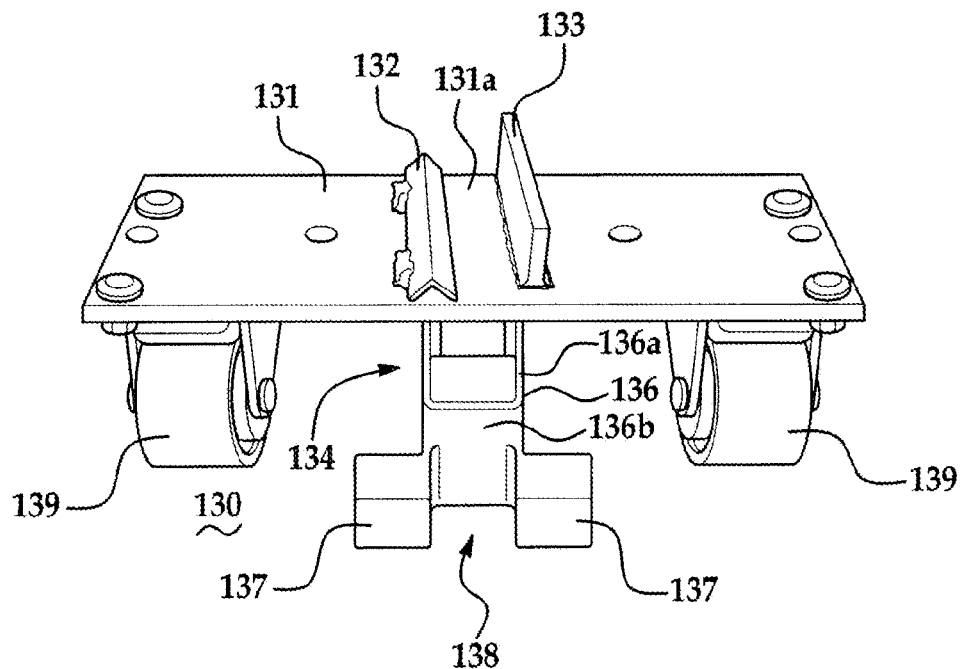
FIG. 5 illustrates the moving device according to the embodiment of FIG. 1.

FIG. 5 illustrates the moving device 130 in further detail. The moving device has a flat top plate, or planar structure, 131. As shown in FIG. 3, the top plate 131, in operation, supports the base section 14 of the shelving system 10. In one example embodiment, the top plate 131 may be approximately 5 inches by 12 inches. Referring again to FIG. 5, an angle piece 132 and a flat strip 133 are centrally mounted, e.g. welded, on the top plate 131. The angled piece 132 and the flat strip 133 extend from the top plate 131 and provide two bounding structures that define a receiving area 131a on the top plate 131 for receiving and supporting the base section 14 of the shelving system 10.

The angled piece 132, for example, may be formed by two strips joined at one edge. The common edge of the angled piece 132 faces upwardly, while the other two edges are joined to the top plate 131. Meanwhile, the flat strip 133 is mounted on the top plate 131 on its edge, substantially forming a 90-degree angle with the top plate 131. The height of the top plate 131 allows the strip 133 to act as a stop for the base section 14 of the shelving system 10. The strip 133 also acts as guide for the user by indicating when the moving guide 130 has reached the position where the shelving system 10 can be appropriately received onto the receiving area 131a.

As shown in FIGS. 1 and 3, the base section 14 of the shelving system 10 is received onto the receiving area 131a, between the angled piece 132 and the flat strip 133. The angled piece 132 also acts as a guide for the base section 14 of the shelving system 10, ensuring that the base section 14 is centered on the moving device 130. Once the moving device 130 receives the base section 14 onto the receiving area 131a, the moving device 130 remains stably aligned and positioned under the base section 14. In an example embodiment, the angled piece 132 and the flat strip 133 are approximately 5 inches long to match the corresponding dimension of the top plate 131. The angled piece 132 may be formed by two 0.5 inch strips joined at one edge. Meanwhile, the flat strip 133 may be approximately 0.25 inch in thickness and may be about 1.25-1.5 inches in height extending from the top plate 131. Also, the receiving area 131a may separate the angled piece 132 and the flat strip 133 by approximately 1.0625 inches. In some embodiments, the angled piece 132, the receiving area 131a, and the flat strip 133 are centered along the 12-inch dimension of the top plate 131.

As shown in FIG. 3, a front section 134 of the moving device 130 creates a space 135 in relation to the shelving system 10. The space 135 is able to receive the lifting finger 117 of the lifting device 110, so that the shelving system 10 can be easily raised from the front by the lifting device 110 when the shelving system 10 is positioned on the moving device 130. This facilitates removal and lowering of the shelving system 10 from the moving device 130.

Figure 6:
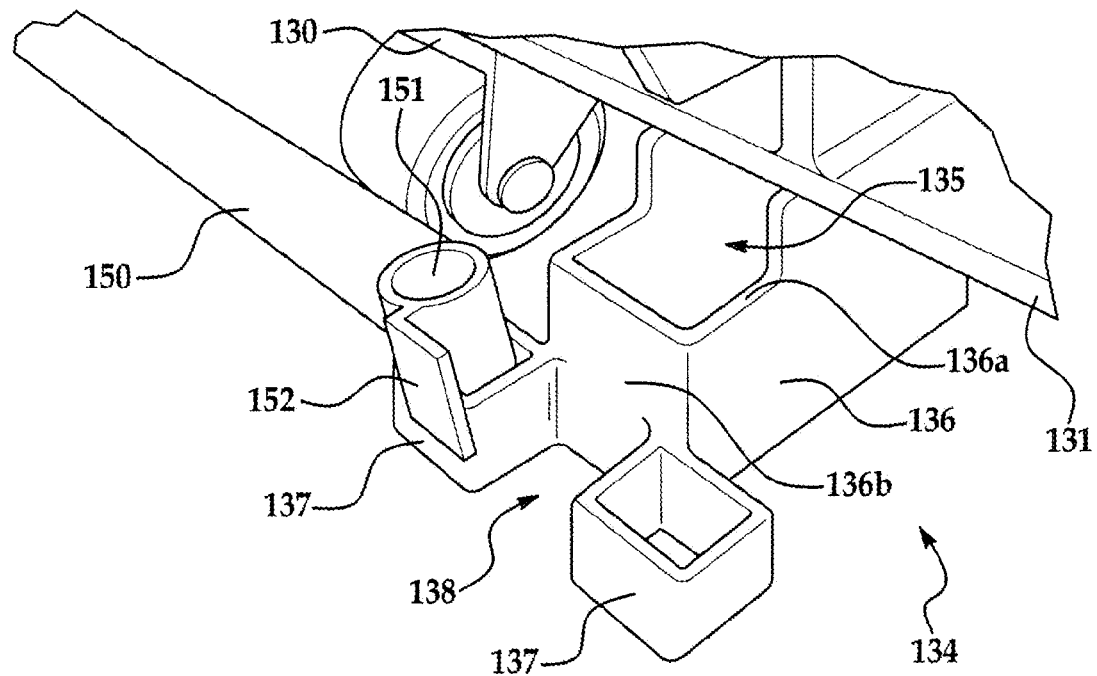
FIG. 6 illustrates the moving device attached to a connecting brace according to the embodiment of FIG. 1.

FIG. 5 illustrates a bracket 136 that is mounted, e.g. welded, at the front section 134 of the moving device 130. The bracket 136 starts at the bottom of the top plate 131 and extends forward beyond the top plate 131. In one embodiment, the bracket 136 may be formed from a tube with a substantially rectangular profile that is welded with two plates to the bottom of the top plate 131. The bracket 136 creates a step 136a in front of, and a distance below, the top plate 131. As shown in FIG. 3, when the moving device 130 is positioned under the shelving system 10, space 135 for receiving the lifting finger 117 is generally bounded by the step 136a and the base section 14 and the leg 12 of the shelving system 10. In an example embodiment, the step 136a as illustrated in FIGS. 5 and 6 is approximately 1 inch from the top plate 131, is approximately 1.25 inches wide, and extends out 1 from the top plate 131. Furthermore, from the step 136a, the bracket 136, which may be correspondingly 1.25 inches wide, may extend downward for approximately 2 inches. Thus, an area of approximately one inch by one inch is created for receiving the lifting device 110, i.e., the lifting finger 117, into the space 135. FIG. 3 also shows that the front surface 136b of the bracket 136 acts as a stop which may abut the leg 12 of the shelving system 10.

FIG. 5 further illustrates a tube 137 of a substantially rectangular profile mounted on either side of the front edge of the front side 136a of the bracket 136. Specifically, the tubes 137 are mounted at the corner edges of the bracket 136 and extend forward and sideways from the sides of the front side 136a. As shown in FIG. 6 and described further below, each tube 137 may engage a connecting brace 150 to permit the moving device 130 to be used in combination with other similar moving devices 130. FIG. 3 also shows that the tubes 137 and the front side 136a of bracket 136 form another space 138 which receives the leg 12 of the shelving system 10. As such, the tubes 137 also act as guides and provide side support for the leg 12, helping the shelving system 130 to remain centered with respect to the moving device 130.

Referring again to FIG. 5, heavy duty ball-bearing swiveling wheels, or casters, 139 are mounted, e.g. welded, to the bottom of the top plate 131. The wheels 139 permit the moving device 130, along with the shelving system 10, to move in any direction with reduced resistance. Specifically, the wheels 139 are attached near the sides and toward the front section 134 of the moving device 130. This placement of the casters 139 allows the wheels to swivel freely. In an example embodiment, the wheels 139 and the top plate 131 together give the moving device 130 a total height of approximately 3.75 inches from the floor. Thus, a user only needs to raise shelving system 10 with lifting device 110 by approximately 1 to 2 inches off the floor to permit positioning of the moving device 130 under the shelving system 10. Advantageously, the minimal amount of lifting results in minimal stress to shelving system 10 and minimizes any chance that product will fall from the shelves during the lifting operation. In addition, the minimal amount of lifting results in the application of minimal stress to the shelving system 10 and thus minimizes the likelihood of instability and/or damage to the shelving system 10. Furthermore, sufficient clearance is provided for a user's hands and fingers for safe operation of the system 100. Although wheels may be employed in the embodiments described herein, it is contemplated that embodiments may employ other movement components that reduce resistance to movement of the moving device 130.

Lifting of the shelving system 10 may be accomplished by placing moving devices 130 under base sections 14 of the shelving system 10 one at a time. For example, a user may raise one side of the shelving system 10 to install the moving device 130 before raising the other side. Preferably, the side of the shelving system 10 with the greatest weight is raised and lowered first. Advantageously, no more than two people are generally required to complete this operation.

As described above, the moving system 100 allows a plurality of moving devices 130 to be used in combination by employing a longitudinal connecting brace 150. As illustrated by FIG. 6, the connecting brace 150 is received into the tubes 137 of moving devices 130 to connect them. The rigid connection provided by the connecting brace 150 keeps the moving device 130 and the legs 12 of the shelving system 10 on center. In one example embodiment, the connecting brace 150 keeps the legs 12 four feet on center. The connecting brace provides support to minimize any deformation of the shelving system 10. Moreover, the connecting brace 150 works in combination with the tubes 137 to receive and securely engage the leg 12.

Figure 7:
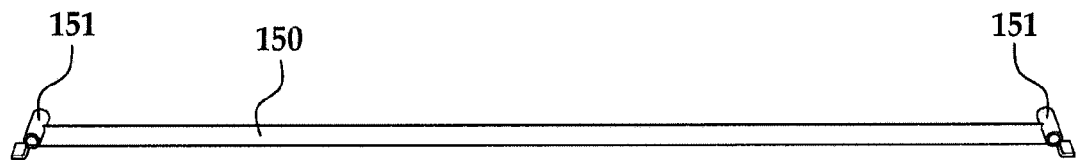
FIG. 7 illustrates the connecting brace according to the embodiment of FIG. 1.
Figure 8:
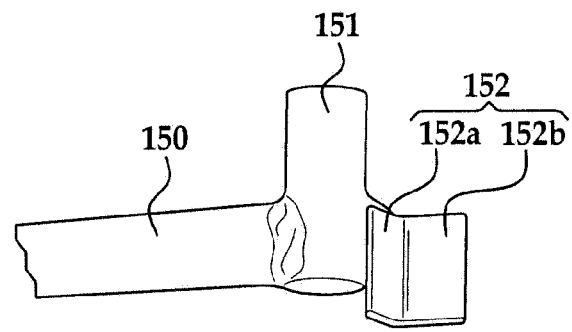
FIG. 8 further illustrates the connecting brace according to the embodiment of FIG. 1.
Figure 9:
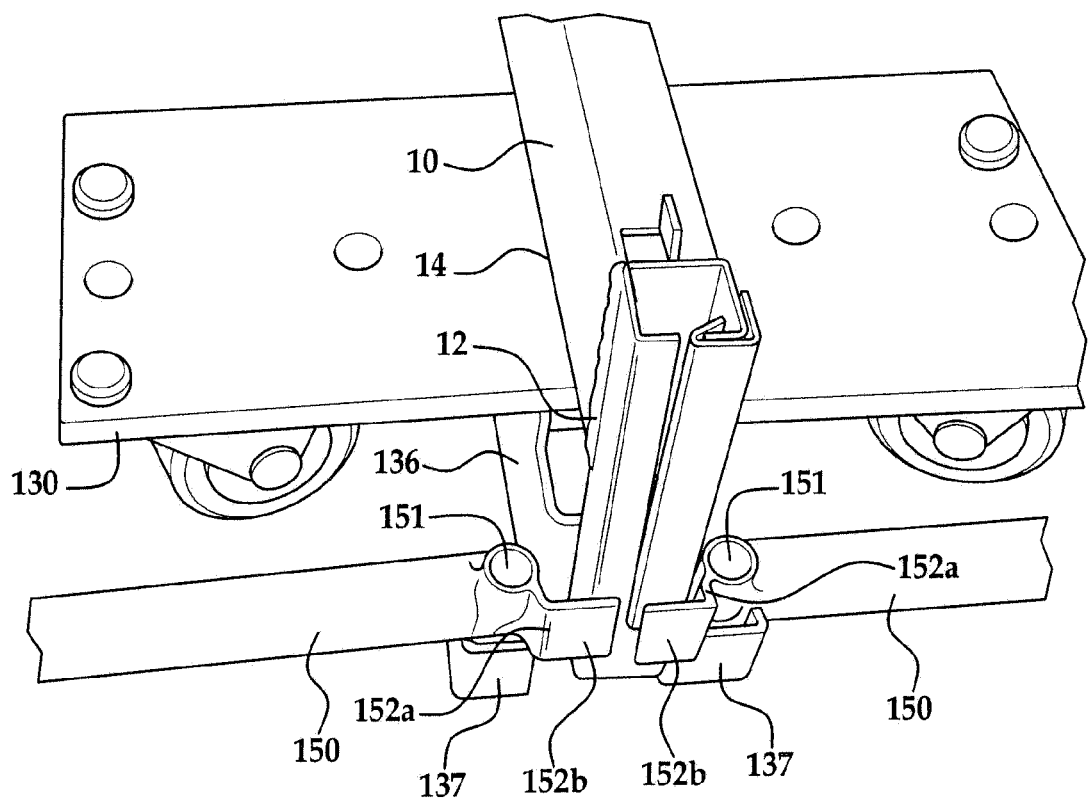
FIG. 9 illustrates the operation of the moving device and connecting braces according to the embodiment of FIG. 1.

FIGS. 7 and 8 illustrate details of the connecting brace 150. The connecting brace 150 has two pins, or projections, 151 positioned on each end. In an example embodiment, the pins extend approximately 1.25 inches transversely from the longitudinal axis of the connecting brace 150. The pins 151 fit downwardly into the tubes 137 of the moving device 130, as shown in FIG. 6. On each end of the connecting brace 150, an angle 152 is mounted, e.g. welded, to form a supporting structure that has a first side 152a extending transversely from the longitudinal axis and a second side 152b that forms a right angle with the first side 152a and extends parallel to the longitudinal axis. As shown in FIG. 9, the supporting structure 152 abuts the front surface of the leg 12 of the shelving system 10. Thus, the supporting structure 152 acts with the bracket 136 and the tubes 137 to securely engage the leg 12 on four sides. In other words, by closing the space 138, the second side 152b acts as a restrictive stop to keep the moving device 130 fixed relative to the foot 12. In an example embodiment, the first side 152a extends approximately 0.75 inch in the transverse direction and the second side 152b extends approximately 0.75 inch in the longitudinal direction.

Figure 10:
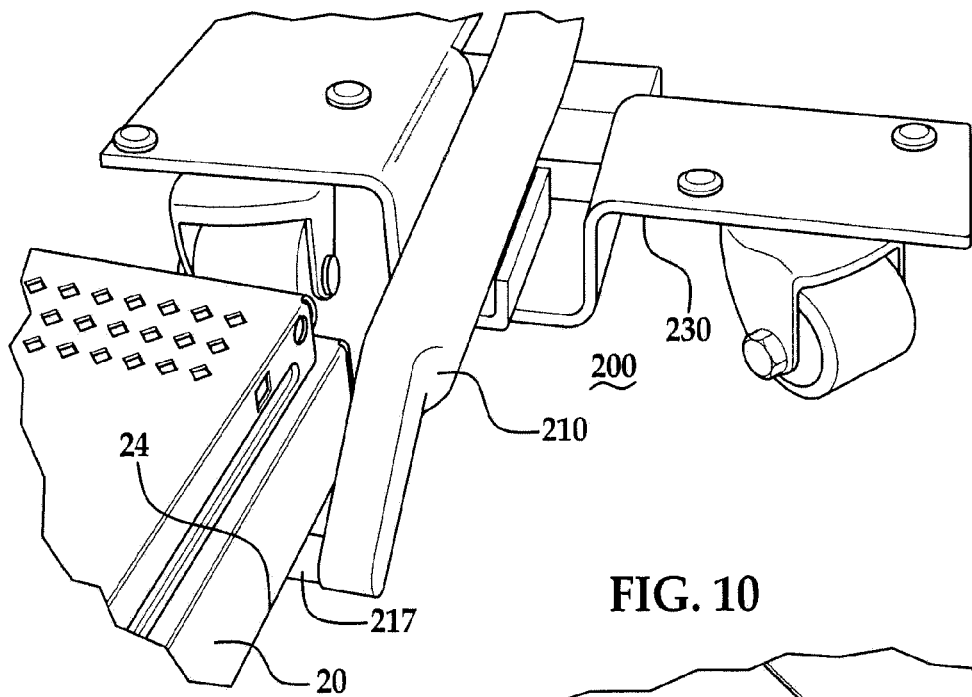
FIG. 10 illustrates another exemplary embodiment according to aspects of the present invention.
Figure 11:
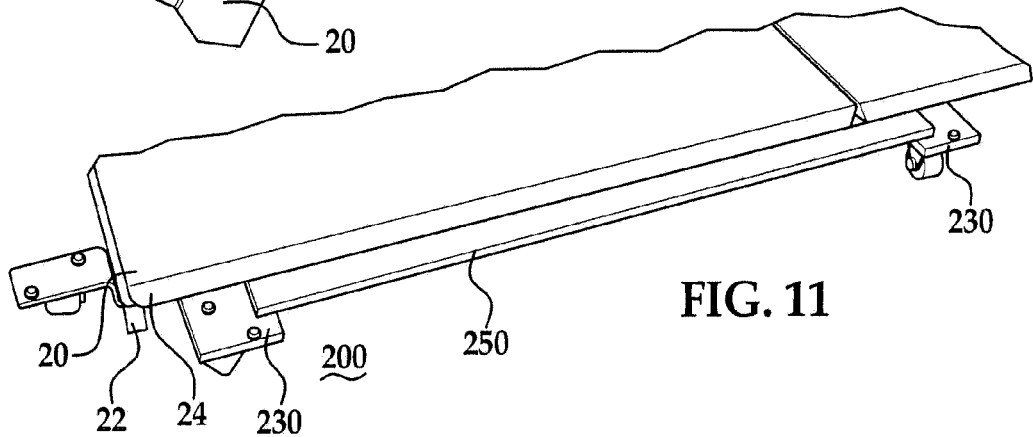
FIG. 11 illustrates the operation of the embodiment of FIG. 10.

Referring to FIGS. 10 and 11, another embodiment of a moving system 200 for lifting and moving a shelving system 20, such as a gondola shelving system, is also illustrated. Advantageously, the moving system 200 may be employed on all types of flooring materials.

In particular, the moving system 200 employs a lifting device 210, a moving device 230, and a connecting brace 250. The lifting device 210, as shown in FIG. 10, is designed to raise the shelving system 20 near the front of the leg 22. As illustrated in FIG. 11, once the shelving system 20 is raised to a sufficient height, the moving device 230 may be placed under the shelving system 20 near the front leg 22, and the shelving system 20 may be lowered onto a stable position on the moving device 230. As further illustrated by FIG. 11, the connecting brace 250 connects a plurality of moving devices 230 and supports their combined use to move the shelving system 20.

Figure 12:
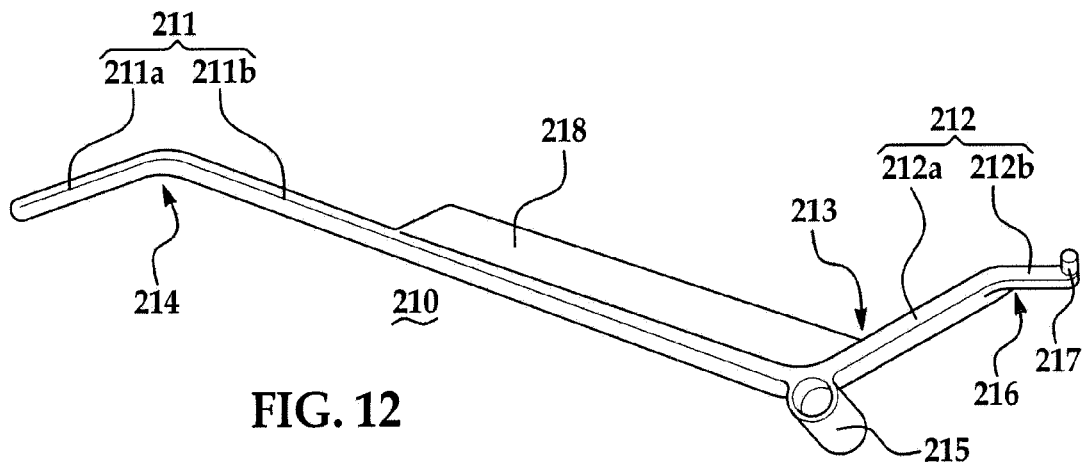
FIG. 12 illustrates the lifting device according to the embodiment of FIGS. 10.

FIG. 12 illustrates the lifting device 210 in further detail. As shown, the lifting device 210 is generally elongate with multiple bends and bracing to strengthen the lifting device 210. In a particular embodiment, the total length of the lifting device 210 is approximately 6 feet, to enable a user to operate the lifting device 210 while standing.

The lifting device 210 includes an operating section 211 and an engagement section 212 integrally formed with each other. The operating section 211 and the engagement section 212 define an angle 213. The operating section 211 may include an angled proximal handle portion 211a to facilitate grasping and handling of the lifting device 210. The handle portion 211a and the remainder 211b of the operating section 211 define an angle 214. The handle portion 211a, for example, is generally at waist level, e.g., approximately 39 inches from the ground surface, in order to provide the user with an easy leverage position during operation of the lifting device 210.

As further shown in FIG. 12, the engagement section 212 of the lifting device 210 includes a main engagement portion 212a and an end portion 212b, which together form an angle 216 that is, for example, about 150 degrees. In particular, during operation, the end portion 212b angles downwardly from the main engagement portion 212a. The engagement section 212 is angled to enable it to go under the base 24 of the shelving system 20. In addition, a lifting finger 217 extends transversely from the end portion 212b for engaging the shelving system 20 during operation of the lifting device 210.

The lifting device 210 includes a transverse pivot element 215 located at a junction of the operating section 211 and the engagement section 212. The pivot element 215 contacts the ground surface from which the shelving system 20 is lifted. To minimize floor damage and enable easy pivoting of the lifting device 210, the pivot element 215 may be substantially cylindrical or may have a curved shape where it contacts the ground surface. Moreover, the pivot element 215 provides a wider stance that stabilizes and keeps the lifting device 210 in a stable upright position during use.

When the lifting device 210 is used to lift the shelving system 20 onto the moving device 230, the lifting device 210 is sufficiently pivoted at the pivot element 215 to enable the end portion 212b to engage the shelving system 20. More specifically, similar to the use of the lifting device 110 illustrated in FIG. 2, the lifting finger 217 is installed under the shelving system 20 near the leg 22. With the lifting finger 217 so installed, the user grasps the handle portion 211a and pushes downward on the operating section 211, causing the engagement section 212 to rotate upwardly about the stable pivot element 215. Correspondingly, this upward motion of the engagement section 212 causes the lifting finger 217 to apply an upward force to the base section 24 near the leg 22. Advantageously, the lifting finger 217 applies the upward force without any pinching, grasping, or significant compression of the base section 24, thereby minimizing the likelihood of damage to the base section 24.

The lifting device 210 may be composed of a rigid, durable material capable of lifting several hundred pounds without deformation. In a particular example embodiment, the operating section 211 and the engagement section 212 are formed in from a single steel pipe having an outer diameter measuring approximately 1.25 inches. The angled handle portion 211a of the operating section 211 has a length of approximately 12 inches, and the remainder 211b of the operating section 111 has a length of approximately 40 inches. Thus, approximately 52 inches is provided from the pivot point 215 to the end of handle portion 211a to receive the downward force for raising the shelving system 20. The main engagement portion 212a has a length of approximately 8.5 inches, and the end portion 212b is approximately 3 inches. The pivot element 215 is also formed from a steel pipe having a length of approximately four inches and an outer diameter measuring approximately 2 inches. The pivot element 215 may be welded to the junction of the operating section 211 and the engagement section 212. The lifting finger 217 is also formed from a steel pipe having a length of approximately 1.75 inches and an outer diameter measuring approximately 0.5 inches.

To reinforce the lifting device 210, the lifting device 210 may include a reinforcement plate 218 connected, e.g., welded, to both the operating section 211 and the engagement section 212. The reinforcement plate 218 helps to prevent the lifting device 210 from bending about the junction joining the operating section 211 and the engagement section 212, thereby maintaining the inclusive angle 213. In an example embodiment, the plate 218 has a maximum length of approximately 24 inches, a width of approximately 1.5 inches, and a thickness of approximately 0.25 inches.

Figure 13:
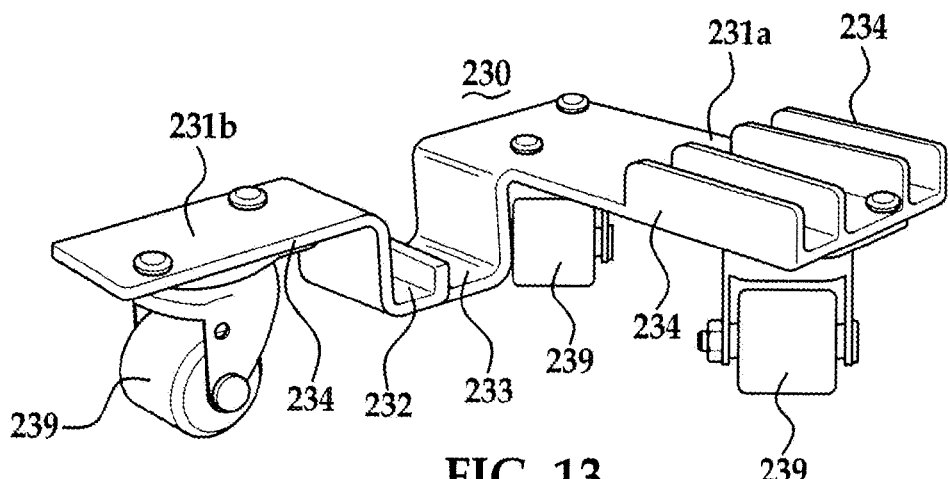
FIG. 13 illustrates the moving device according to the embodiment of FIG. 10.

FIG. 13 illustrates the moving device 230 in further detail. In general, the moving device 230 includes three heavy duty ball-bearing swiveling wheels, or casters, 239 attached to an L-shaped structure 231. The structure 231 has a flat plate section 231a, forming one leg of the L-shape. A wheel 239 is attached generally at each end of the flat plate section 231a. The structure 231 also has a section 231b, forming the second leg of the L-shape. As further shown in FIG. 13, a wheel 239 is attached to one end of the section 231b, while the other end of the second section 231b is attached to the flat plate section 231a. In an example embodiment, the flat plate section 231a is about 4.5 inches by about 10 inches, while the section 231b is approximately about 3 inches by about 8 inches.

As more clearly shown in FIG. 14, the section 231b has two U-shaped channels 232 and 233 in a recess that extends below the height of a top plate 234. The first channel 232 may be shallower than the second channel 233. In operation, the first channel 232 receives the base 24 of the shelving system 20 when the shelving system 20 is positioned on the moving element 230. The first channel 232 may have varying sizes based, for example, on the size of the base 24 received into the first channel 232. In an example embodiment, the bottom of the first channel 232 is approximately 2 inches from top plate 234 and can be approximately one inch or two inches wide.

Meanwhile, the second channel 233, as shown in FIG. 10, allows the lifting device 210 to operate over the moving device 230 and to lift the shelving system 20 onto the moving device 230. The main engagement portion 212a is sized to pass through, and operate in, the second channel 233. Moreover, the height of the pivot element 215 allows the main engagement portion 212a to be positioned in the second channel 233, and is high enough to minimize any force on the moving device 230 when downward force is applied to raise the shelving system 20. When the moving device 230 is being positioned under the shelving system 20, the leg 22 may pass through the channel 233. Thus, the moving device 230 may be installed from the front of the shelving system 20. Advantageously, the channel 233 is close to the ground, thereby minimizing the height required to lift leg 22 to install the moving element 230. In an example embodiment, the bottom of the second channel 233 is 2.5 inches from the top plate 234 and is 1-1.5 inches wide. Moreover, the wall that separates the first channel 232 and the second channel 233 may be one inch from the bottom of the second channel 233.

Figure 14:
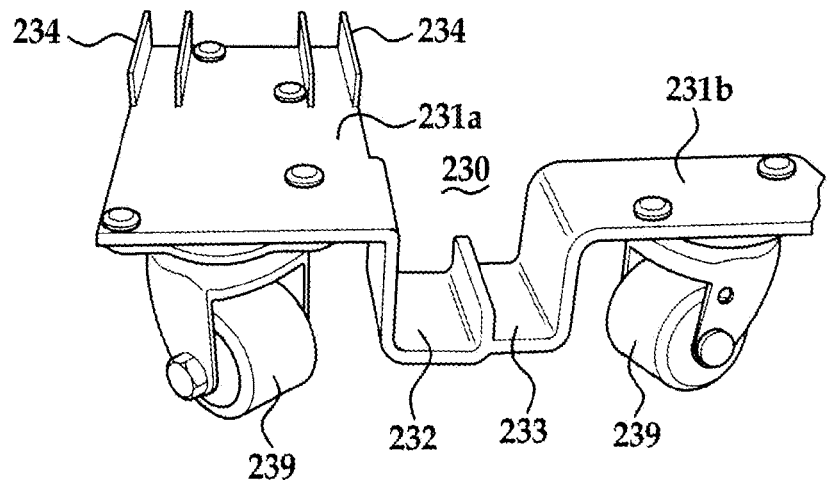
FIG. 14 further illustrates the moving device according to the embodiment of FIG. 10.

As further shown in FIGS. 13 and 14, two additional U-shaped channels 234 are attached to the top of the flat plate section 231a towards the outer edge. The channels 234 receive and securely hold the connecting braces 250. With the connecting braces 250, the channels 234 provide support in stabilizing the shelving system 20 and keeping the base of the shelving system 20 on center. In an example embodiment, each channel 234 is approximately one inch wide and 4.5 inches long.

As described previously, heavy duty ball-bearing swiveling wheels, or casters, 239 are mounted to the L-shaped section 231. The wheels 239 permit the moving device 230, along with the shelving system 20, to move in any direction. In an example embodiment, the wheels 239 and the top plate 231 together give the moving device 230 a total height of approximately 3.75 inches from the floor, which is slightly higher than the typical height of the bottom of the base 24 when the shelving system 20 is resting on the ground surface. Matching this height helps to ensure that the base shelf remains with the shelving system 10 and does not fall off the legs 22. Moreover, a user only needs to raise shelving system 20 with lifting device 210 by approximately one to two inches off the floor to permit positioning of the moving device under the shelving system 20. Advantageously, the minimal amount of lifting results in minimal stress to shelving system 20 and minimizes any chance that product will fall from the shelves during the lifting operation. In addition, the minimal amount of lifting results in the application of minimal stress to the shelving system 20 and thus minimizes the likelihood of instability and/or damage to the shelving system 20. Furthermore, sufficient clearance is provided for a user's hands and fingers for safe operation of the system 200.

Lifting of the shelving system may be accomplished by lifting and placing the moving device 230 under the shelving system 20 one at a time. For example, a user may raise one side of the shelving system 20 to install the moving device 230 before raising the other side. Preferably, the side of the shelving system 20 with the greatest weight is raised and lowered first. Advantageously, no more than two people are generally required to complete this operation.

Figure 15:
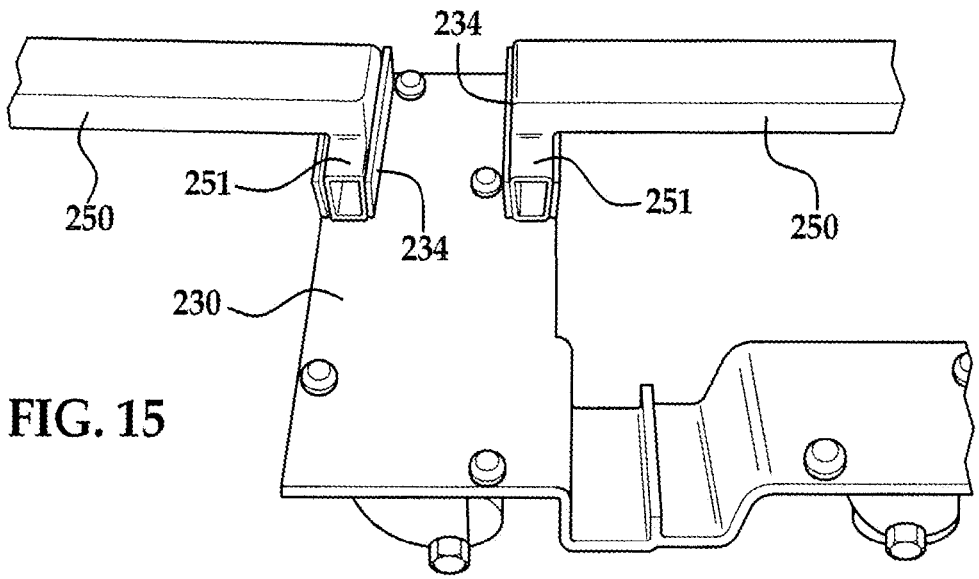
FIG. 15 illustrates the operation of the moving device and connecting braces according to the embodiment of FIG. 10.

As described above, the moving system 200 allows a plurality of moving devices 230 to be used in combination by employing a longitudinal connecting brace 250. As illustrated by FIG. 15, the connecting brace 250 is received into channels 234 to connect the moving devices 230. The rigid connection provided by the connecting brace 250 keeps the moving device 230 and the legs 22 of the shelving system 20 on center. In an example embodiment, the connecting brace 150 keeps the legs 12 four feet on center. The connecting brace provides support to minimize any deformation of the shelving system 20. Moreover, the connecting brace 250 works in combination with the channels 234 to receive and securely engage the leg 22.

FIG. 15 illustrates details of the connecting brace 250. The connecting brace 250 has a cross bar piece 251 extending downward on each end. In an example embodiment, the cross bar piece is one inch by one inch by four inches. The cross bar pieces 251 fit into the channel 234. When the connecting brace 250 is received into the channels 234, the design and location of the connecting brace 250 causes it to act as a stopping mechanism, as illustrated in FIG. 11. In other words, the connecting brace 250 comes into contact with the base deck shelf of the shelving system 20, thus restricting the moving device 230 from moving relative to the leg 22.

As described previously, the lifting devices 110 and 210 described previously facilitate the manual lifting of a shelf unit. Advantageously, the lifting devices 110 and 210 enable a shelf unit to be raised onto a moveable device for transport without employing hydraulic jacks, pallet jacks, ratchets, pumps, or any heavy equipment to raise the shelf unit. In addition, the lifting devices 110 and 210 are easy to use, in part because no moving parts must be adjusted. Indeed, the lifting devices 110 and 120 are not limited to raising a shelf unit onto a moveable device. For example, the lifting devices 110 and 120 may be employed to raise a shelving system for other purposes, including, but not limited to, removing/installing carpet/tile or leveling the shelving system.

Figure 16:
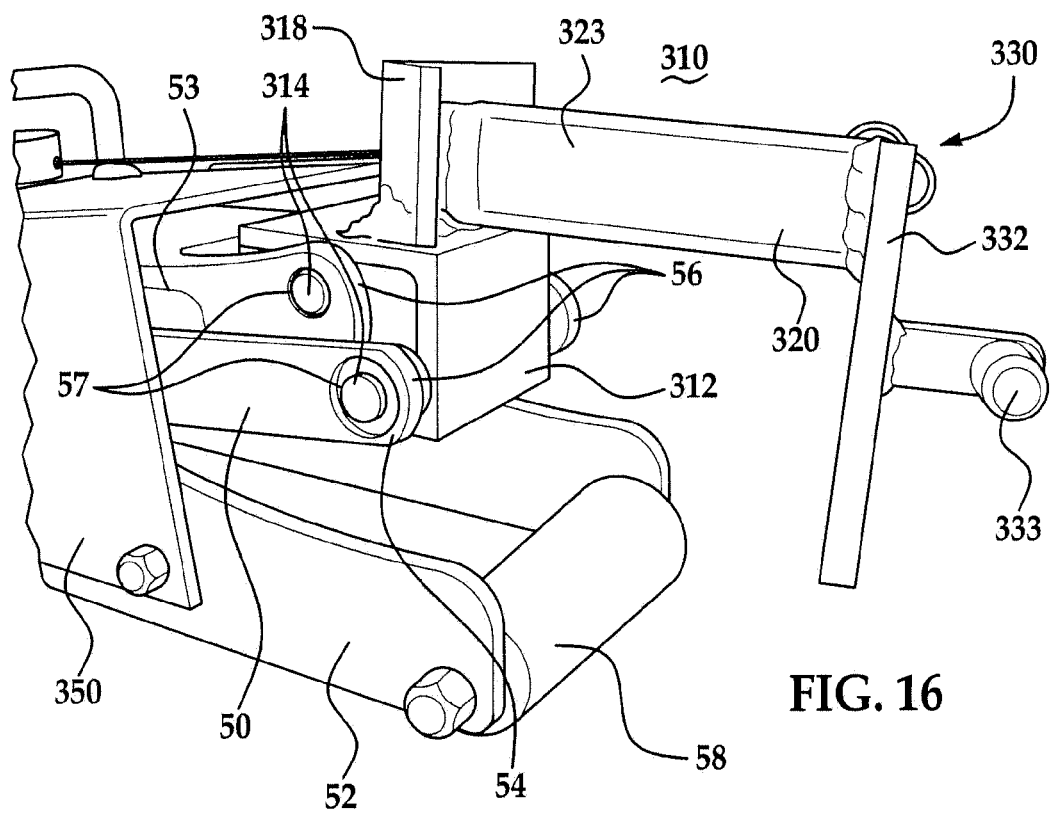
FIG. 16 illustrates an embodiment of an alternative lifting system according to aspects of the present invention.

However, embodiments are not limited to the use of the lifting devices, such as those described hereinabove. In fact, embodiments may further minimize manual effort by employing assisted systems to lift shelf units onto a moveable device. For example, FIG. 16 illustrates a lifting system 310 that lifts a shelf unit with the assistance of a jack. In particular, the lifting system 310 includes a jack 50 equipped with a lifting block 312 and a lifting bracket 320. The lifting system 310, for example, may be employed with the shelving systems described herein.

Figure 17:
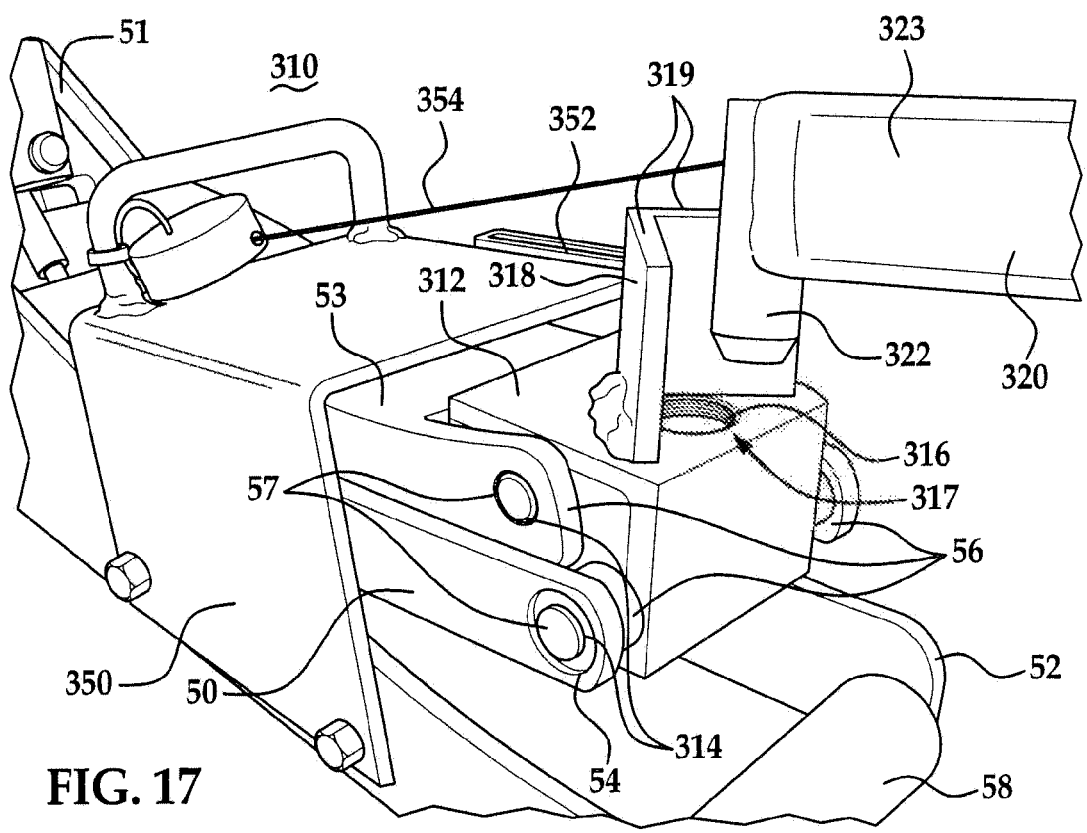
FIG. 17 illustrates another operative configuration of the lifting system according to the embodiment of FIG. 16.
Figure 18:
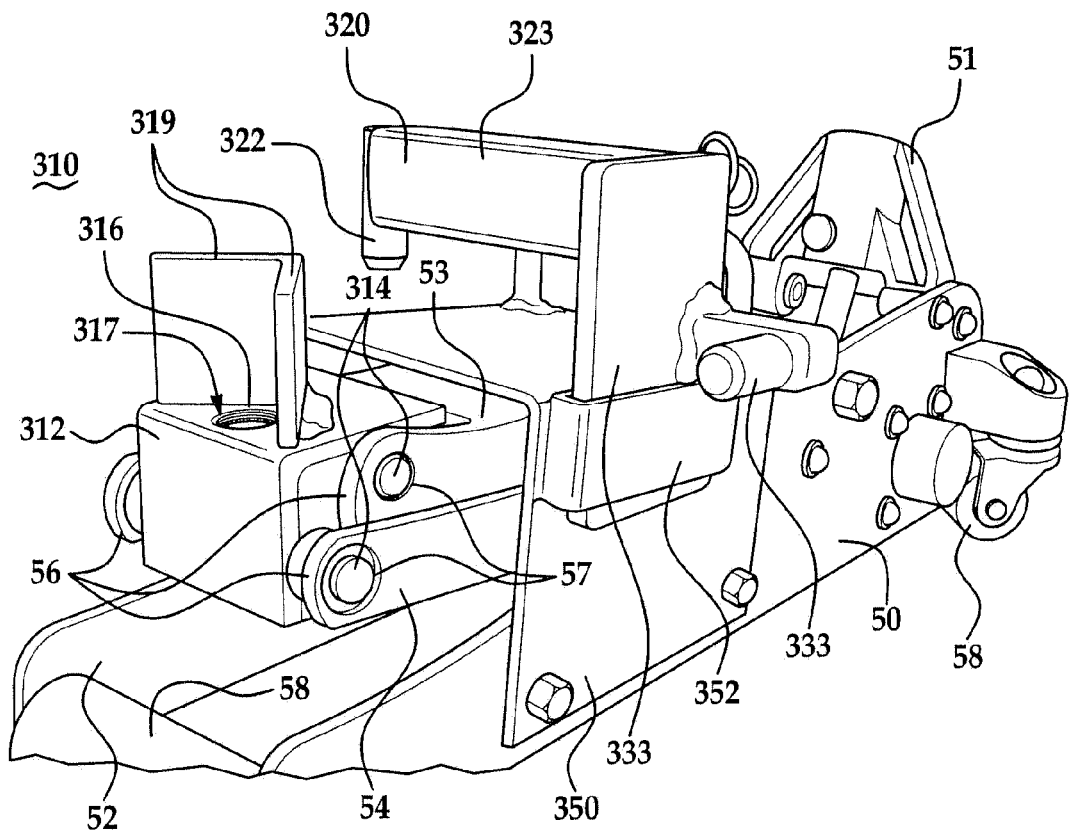
FIG. 18 illustrates yet another operative configuration of the lifting system according to the embodiment of FIG. 16.

As shown in FIGS. 16-19, the jack 50 includes a base 52 that stably positions the jack 50 on a ground surface for operation of the jack 50. The jack 50 includes a handle socket 51 for receiving a handle (not shown) that operates the jack 50. The jack 50 further includes a lifting portion 54 that moves relative to the base 52 in a generally upward or downward direction when the jack 50 is operated with the handle. In particular, the lifting portion 54 may be positioned at one end of a pivoting structure 53 which may pivot upwardly or downwardly at the other end with the operation of the handle. To facilitate movement of the jack 50 along a ground surface, the jack 50 may also include any combination and/or variety of wheels or rollers 58. Furthermore, as shown in FIGS. 16-18, a housing 350 may be attached to the jack 50 over a part of the pivoting structure 53 to limit the upward movement of the lifting portion 54. As FIG. 18 illustrates, the housing 350 may include a storage receptacle 352 for receiving the lifting bracket 320 or a part thereof, so that the lifting system 310 may be conveniently stored and transported with the jack 50. In addition, an extendible cable 354 as shown more clearly in FIG. 17 may be employed to attach the lifting bracket 320 to the housing 350, so that the lifting bracket 320 does not become separated from the jack 50 and misplaced. It is understood that the jack 50 is not limited to the configuration illustrated in FIGS. 16-19, and may be any device for lifting objects using various mechanical, pneumatic, hydraulic, or other assisted techniques.

As illustrated in FIGS. 16-19, the lifting block 312 is stably mounted to the lifting portion 54 of the jack 50. In particular, FIGS. 16-18 show that the lifting block 312 includes pins 314 which are received by apertures 57 in opposing members 56 of the lifting portion 54. In this way, the lifting block 312 is mechanically coupled to the lifting portion 54. In other embodiments, the lifting portion 54 may include a platform, stage, or other structure to which the lifting block 312 can be coupled. In addition, other embodiments may employ other techniques for coupling the lifting block 312 to the lifting portion 54, including, but not limited, to the use of fasteners, welding, adhesives, chemical bonding elements, and threaded or other mechanically interlocking engagement.

FIG. 16 illustrates the lifting bracket 320 coupled to the lifting block 312, while FIG. 17 illustrates the lifting bracket 320 decoupled from the lifting block 312. To couple the lifting bracket 320 and the lifting block 312, the lifting bracket 320 includes a substantially cylindrical coupling member 322 that extends downwardly and is received through a circular opening 317 into a corresponding receptacle 316 at the top of the lifting block 312. It is contemplated that the lifting block 312 and the lifting bracket 320 may be configured with different arrangements of projections, receptacles, and/or other structures to stably couple the lifting bracket 320 to the lifting block 312.

The lifting block 312 may also include a positioning guide 318 that extends upwardly from the top surface of the lifting block 312. The positioning guide 318 guides the receptacle 316 into engagement with coupling member 322 as described below. In addition, the positioning guide 318 can support the lifting bracket 320 when the coupling member 322 is received into the receptacle 316. As shown in FIG. 17, the positioning guide 318 may include two planar structures 319 that are joined at an edge to form an angle to surround a portion of the opening 317. (It is noted that the positioning guide 318 and the housing 350 are omitted from in FIG. 19 to illustrate particular aspects of the embodiment more clearly.)

Referring to FIG. 16, the lifting bracket 320 includes an engagement device 330 that can engage the shelving system 30. An extension 323 extends the lifting bracket 330 horizontally away from the coupling member 322. Thus, the lifting bracket 330 can be positioned to engage the shelving system 30 when the coupling member 322 is received by the receptacle 316 in the lifting block 312.

Figure 19:
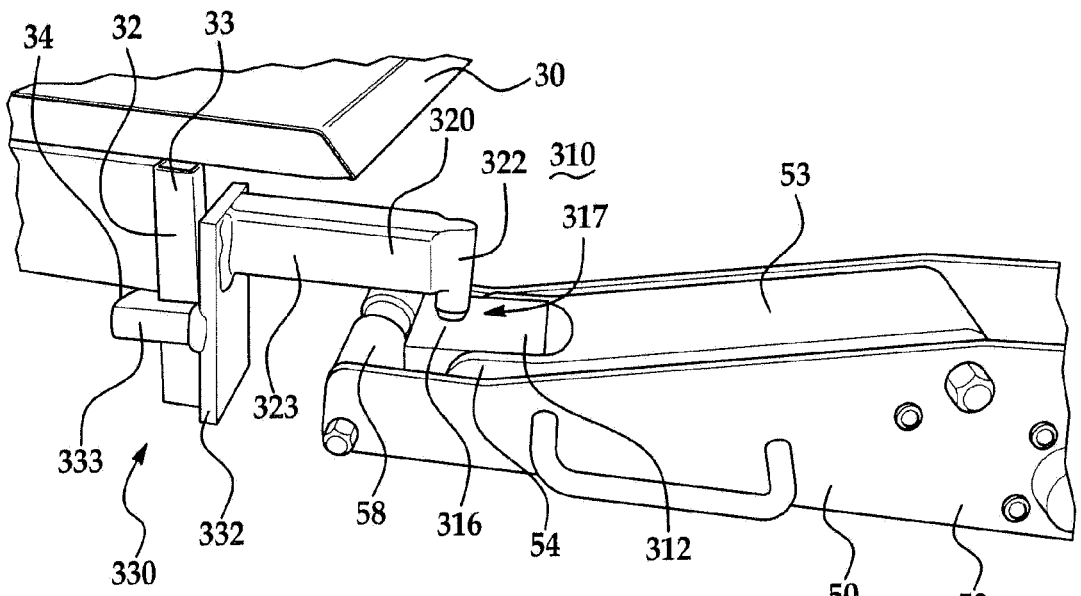
FIG. 19 illustrates a further operative configuration of the lifting system according to the embodiment of FIG. 16.

As shown in FIG. 19, the engagement device 330 engages the shelving system 30 around a leg 32. The engagement device 330 includes a vertically-oriented support member 332 that can be positioned against a front portion 33 of the shelving system at the leg 32. Although the support member 332 shown in FIGS. 16-19 is a rectangular plate, the support member 332 may have any shape that provides appropriate support to the shelving system 30 when the lifting system 310 is operated as discussed in detail below.

The engagement device 330 also includes a lifting finger 333 that extends from the support member 332 and around the leg 32 to contact a base section 34 of the shelving system 30. By contacting the base section 34, the lifting finger 333 can apply an upward force against the shelving system 30 when the lifting system 310 is operated. The lifting finger 333 may contact the shelving system 30 in a manner similar to the lifting finger 117 described previously.

Referring to FIG. 19, an example technique for operating the lifting system 310 is illustrated. First, the engagement device 330 is positioned to engage the shelving system at the leg. In other words, the support member 332 is positioned against the front portion 33 at the leg 32 while the lifting finger 333 is placed under base section 14. The contact between the engagement device 330 and the shelving system enables the lifting bracket 320 to remain stably in the position shown in FIG. 19. The lifting bracket 320 is configured so that when the lifting bracket 320 is in this position, the extension 323 extends horizontally from the support member 332 at a height that allows the lifting block 312 to be placed below the coupling member 322. In other words, the coupling member 322 is positioned a sufficient distance from the shelving unit and the ground surface to position the lifting block 312 below the lifting bracket 320. Positioning of the lifting block 312 is facilitated by the rollers/wheels 58 on the jack 50.

When the lifting block 312 is placed below the coupling member 322, the lifting portion 54 of the jack 50 is generally in a lowered position. As a result, the jack 50 can be operated to raise the lifting portion 54 into a raised position and move the receptacle 316 of the lifting block 312 into engagement with the coupling member 322. During this process, the positioning guide 318 may be employed to ensure that the lifting block 312 is properly positioned relative to the coupling member 322. Once the coupling member 322 is received into the receptacle 318, the jack 50 can be further operated to raise the lifting block 312. Because the lifting block 312 is coupled to the lifting bracket 320 from below, the upward movement of the lifting block 312 applies an upward force to the lifting bracket 320. Correspondingly, the lifting finger 333 of the engagement device 330 applies an upward force to the shelving system 30 from below the base section 34. The upward force on the shelving system 30 is sufficient to cause the shelving system 30 to be raised from the ground surface at the leg 32. In this way, the lifting block 312 and the lifting bracket 320 combine to provide an intermediate structure that couples the shelving system 30 with the operation of the jack 50.

The lifting system 310 engages the shelving system 30 in a manner that ensures controlled and stable upward movement of the shelving system 30. The shelving system 30 is raised to a sufficient height to enable the moving device 130, for example, to be positioned below the shelving system as described previously. However, as discussed above, a housing 350 may be attached to the jack 50 over a part of the pivoting structure 53 to limit the upward movement of the lifting portion 54. The housing 350 thus limits the upward movement of the shelving unit reducing the likelihood that the shelving unit will be tilted into an unstable position. Advantageously, the items do not have to be removed from the shelves in many cases due to the controlled movement of the shelving system 30.

Once the moving device 130, for example, is appropriately positioned below the shelving system 30, the jack 50 can be operated to lower the lifting portion 54 into a lowered position. The corresponding downward movement of the lifting block 312 and the lifting bracket 320 lowers the shelving system onto the moving device 130. As described previously, the lifting finger 333 may engage the shelving system 30 in a manner similar to the lifting finger 117 described previously. Thus, the lifting finger 333 can be positioned in the space 135 between the moving device 130 and the base section 34 of the shelving system 30, in the same way that the lifting finger 117 is disposed in the space 135 as shown in FIG. 3.

Further operation of the jack 50 allows the lifting block 312 to be disengaged from the coupling member 322. The jack 50 and the lifting block 312 can be moved away from the shelving system 30 and the lifting bracket 320 can be disengaged from the shelving system 30. This process can be repeated as necessary to place the shelving system 30 on a sufficient number of moving devices 130, for example, and permit the use of connecting braces 150. The shelving system can then be moved to a desired location as described previously. Once the shelving system 30 is in the desired location, the moving device 130 or 230 can be removed by raising the shelving system with the jack 50, the lifting block 312, and the lifting bracket 320 in the manner also previously described.

Advantageously, the lifting system 310 enables one person to move the shelving system. For example, in a step-by-step approach, one person, without assistance, can 1) engage the lifting bracket 320 with the shelving system, 2) position the jack 50 and the lifting block 312 below the coupling member 322, 3) operate the jack 50 to engage the lifting block 312 with the lifting bracket 320, 4) operate the jack 50 to raise the shelving system to a desired height, 5) place a moving device under the shelving system, and 6) lower the shelving system onto the moving device. It is contemplated that the lifting system 310 may be applied according to a different order or set of steps. For example, the lifting bracket 320 may be coupled to the lifting block 312 before the lifting bracket 320 is positioned at the base section 34 to raise the shelving unit.

Figure 20:
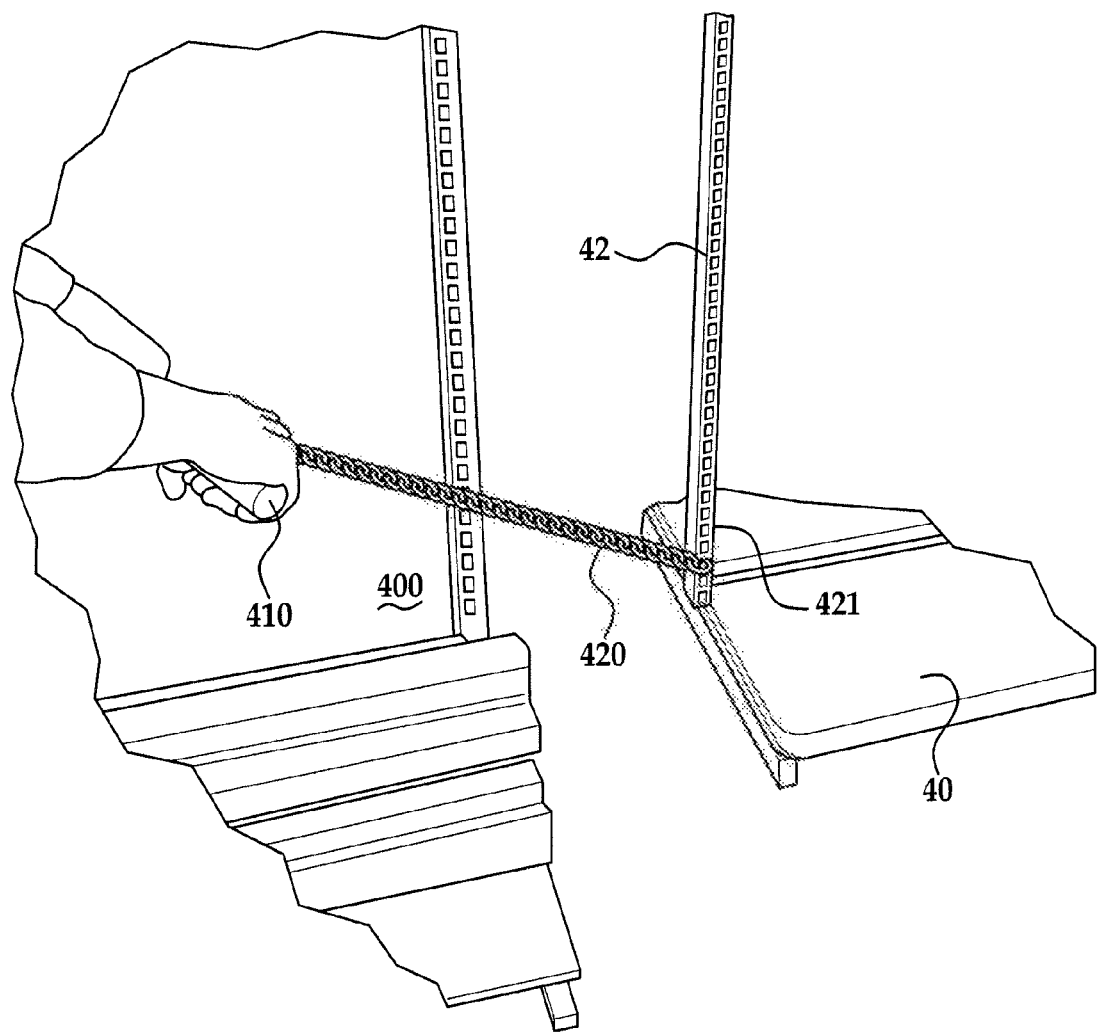
FIG. 20 illustrates a pull chain employable with embodiments of the present invention.

As shown in FIG. 20, an optional pull chain 400 may be employed with the moving systems 100 and 200 described previously. The pull chain 400 facilitates moving a shelving system 40 and moves it with less stress to the shelving system 40. The pull chain 400 may include a bar 410 and a chain 420 attached in the middle of the bar 410. The chain may have an open hook 421 on the other end for attaching to the shelving system. In one embodiment, the hook 421 is made to fit into the shelf support holes of an upright beam 42 of the shelving system 40. Moreover, the hook 421 may be attached to the lowest available point on the upright beam. For example, the bar 410 is about one foot in length and the chain is about six feet long. The pull chain 400 may be attached at various points on the length of shelving system, usually on both ends and sometimes in the middle depending on the length and total weight of the shelving system.

Although aspects of the embodiments described herein may be formed from a metal, such as steel or the like, it is contemplated that components may be formed from any material that exhibits suitable strength and durability. Where required, the components may be joined or connected according to any appropriate technique, including, but not limited to the use of fasteners, welding, adhesives, chemical bonding elements, and threaded or other mechanically interlocking engagement. However, it is contemplated that any combination of components may be formed integrally rather than being joined or connected as separate components. In addition, although particular geometric measurements and configurations may be provided in the descriptions herein, it is understood that these are merely provided as examples to enhance understanding of aspects of the present invention.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

I claim:

1. A lifting system for lifting a shelving system, the lifting system comprising:
    a jack with a lifting portion, the jack being operable to move the lifting portion upwardly or downwardly relative to a ground surface,
    a lifting bracket having an integral feature for mating with a corresponding feature on the lifting portion of the jack such that the lifting bracket is removably coupled to the lifting portion of the jack, the lifting bracket comprising a lifting element disposed at an end thereof, the lifting element comprising a first portion projecting from the lifting bracket in a first horizontal direction generally parallel to the lifting bracket, the lifting element further comprising a second portion projecting from the first portion in a second horizontal direction generally perpendicular to the first horizontal direction, both the first portion and the second portion projecting at substantially identical heights relative to the lifting bracket, the lifting element being configured to extend at least partially around (i) a side of a leg of the shelving system and (ii) a front or a back of the leg of the shelving system such that the lifting bracket is configured to removably engage a section of a shelving system with the lifting element and couple operation of the jack to upward or downward movement of the section of the shelving system relative to the ground surface, the lifting element being positioned forward of the lifting portion of the jack to engage the section of the shelving system.

2. The lifting system according to claim 1, wherein the lifting bracket further comprises a support member, the lifting element projecting from the support member, the support member and the lifting element combining to engage the shelving system, the lifting element applying an upward force on the section of the shelving system during upward movement of the lifting portion, and the support member configured to be adjacent to and to support the shelving system during upward movement of the shelving system.

3. The lifting system according to claim 2, the section of the shelving system being positioned on one side of a leg of the shelving system, the leg contacting the ground surface and supporting the shelving system, and the lifting element and the support member being configured to be positionable on opposing sides of the leg, the support member being configured to provide vertical support for a face of the shelving system and the lifting element being configured to extend below the section of the shelving system.

4. The lifting system according to claim 1, further comprising a receiving structure coupling the lifting bracket to the lifting portion of the jack.

5. The lifting system according to claim 4, wherein the receiving structure includes a receptacle, and the lifting bracket includes a projection that is removably received by the receptacle when the receiving structure couples the lifting bracket to the lifting portion.

6. The lifting system according to claim 5, further comprising an extension positioning the lifting element away from the projection and at the section of the shelving system.

7. The lifting system according to claim 5, wherein the receiving structure includes a positioning guide guiding the projection into the receptacle when the projection is removably received by the receptacle.

8. The lifting system according to claim 5, further comprising a housing coupled to the jack, the housing limiting upward movement of the lifting portion.

9. The lifting system of claim 1, further comprising a housing coupled to the jack, the housing including a storage receptacle configured to receive at least a portion of the lifting bracket when the lifting bracket is removed from the lifting portion of the jack.

10. A lifting system for lifting a shelving system, the lifting system comprising:
    a jack including a base, a lifting portion configured to move relative to the base, and a lifting block coupled to the lifting portion, the lifting block including a lifting block feature; and
    a lifting bracket, the lifting bracket having a first end with a lifting bracket feature integrally formed thereon, the lifting bracket feature configured to receive or to be received by the lifting block feature such that the lifting bracket is removably coupled to the lifting block, the lifting bracket further including an opposing second end having a generally vertically oriented support member extending therefrom, the first end of the lifting bracket being disposed at a first height and the second end of the lifting bracket each being disposed at a second height, the first height being substantially the same as the second height, the support member having a lifting element projecting therefrom, the lifting element comprising a first portion projecting from the support member in a first horizontal direction generally parallel to the lifting bracket, the lifting element further comprising a second portion projecting from the first portion at a second horizontal direction generally perpendicular to the first horizontal direction, the first portion and the second portion being disposed at a third height different from the first height, the lifting element being configured to contact a bottom of the shelving system and to extend at least partially around (i) a side of a leg of the shelving system and (ii) a front or a back of the leg of the shelving system.

11. The lifting system of claim 10, wherein the lifting bracket feature is a downwardly extending coupling member and the lifting block feature is a receptacle configured to receive the lifting bracket feature.

12. The lifting system of claim 11, wherein the lifting block further includes a positioning guide configured to guide the lifting bracket feature into engagement with the lifting block feature.

13. The lifting system of claim 10, wherein the lifting element is configured to apply an upward force against the shelving system when the lifting system is operated.

14. The lifting system according to claim 10, further comprising a housing coupled to the jack, the housing limiting upward movement of the lifting portion.

15. The lifting system of claim 10, further comprising a housing coupled to the base, the housing including a storage receptacle configured to receive at least a portion of the lifting bracket when the lifting bracket is removed from the lifting block.

* * * * *